Figure 1:
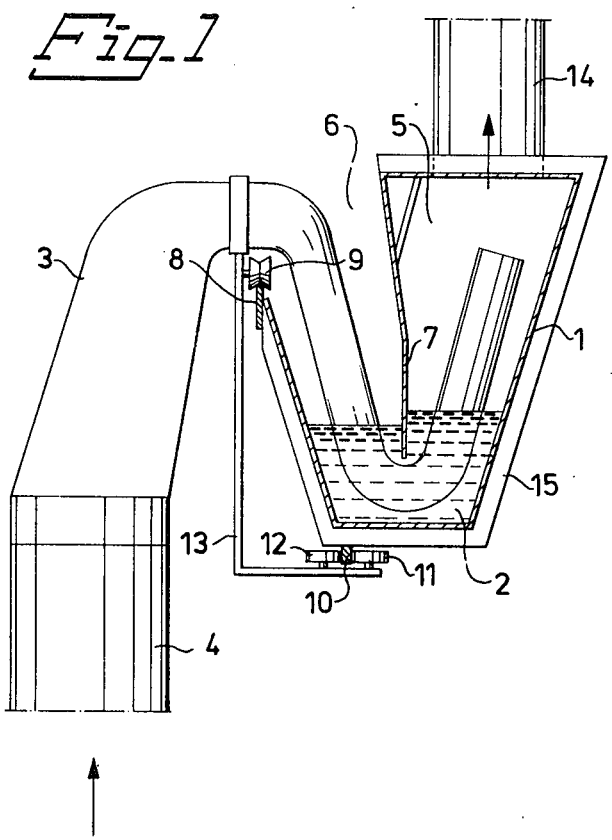

United States Patent [19]

Lindqvist

[11] 4,026,200

[45] May 31, 1977

[54] ARRANGEMENT FOR SUPPLYING OR REMOVING GASEOUS SUBSTANCES TO OR FROM A MOVABLE OBJECT

[76] Inventor: Bo Lars Einar Lindqvist, Lyktvagen 3, 132 00 Saltsjobaden, Sweden

[22] Filed: Jan. 21, 1976

[21] Appl. No.: 651,175

[30] Foreign Application Priority Data

Jan. 28, 1975 Sweden .............................. 7500879

[52] U.S. Cl. ........................ 98/115 VM; 137/251; 137/580; 202/263; 277/135
[51] Int. Cl.² ........................................ F23J 11/00
[58] Field of Search ................ 98/115 R, 115 VM; 137/251, 580, 93, 210; 202/263, ; 277/135

[56] References Cited

UNITED STATES PATENTS

| | | | |
|---|---|---|---|
| 3,129,717 | 4/1964 | Main et al. ........................... | 137/93 |
| 3,416,547 | 12/1968 | Glenn, Jr. et al. .................. | 137/210 |
| 3,955,484 | 5/1976 | Hirahama et al. ........... | 98/115 VM |

*Primary Examiner*—Ronald C. Capossela
*Attorney, Agent, or Firm*—Silverman & Cass, LTD.

[57] ABSTRACT

Waste gas collecting apparatus comprising an elongate duct or trough having a pair of parallel portions defined by a partition, one portion being enclosed and the other having a top opening. The closed portion is coupled to an exhaust duct. Sealing liquid is introduced in the trough with the level interior of the closed portion higher than the level in the open portion. A bent hollow pipe is introduced into the open portion of the trough, through both portions thereof to terminate above the liquid level in the closed portion of the trough. The opposite end of the pipe is coupled to a source of waste gases. The pipe is mounted on a carriage and the carriage and pipe guided for movement along the length of the trough. The carriage is mounted movably to the trough by a wheel and rail arrangement along one wall of the trough and guided during its movement by a suitable wheel and rail arrangement along the bottom exterior wall of the trough.

6 Claims, 2 Drawing Figures

U.S. Patent May 31, 1977 4,026,200

ARRANGEMENT FOR SUPPLYING OR REMOVING GASEOUS SUBSTANCES TO OR FROM A MOVABLE OBJECT

This invention relates to an arrangement for supplying gaseous substances to a movable object or removing them therefrom, and particularly to an arrangement for evacuating waste gases from movable objects in a room.

It is often desired to be able to remove waste gases and the like from motor vehicles or other movable objects in garages, car testing premises, workshops and similar rooms. Also in boat-yards, for example, waste gases developing at welding or cutting operations in long pieces of sheet metal have to be removed. For this purpose, a suction conduit must be arranged which is movable together with the movable waste gas source and connected to a suction means. At conventional arrangements for this purpose, for example, a hose forming folds or loops is suspended on a rail or on runners or the like travelling on a rail. At another arrangement an oblong conduit is used, which extends in the longitudinal direction of the room, and includes a longitudinal slit, which is sealed with rubber or the like and into which the end of a suction hose is movably fitted. The suction hose is movable in the longitudinal direction of the conduit on a carriage, which with its wheels runs on a portion of the conduit. The object, however, has not been solved satisfactorily by these known arrangements, which show the following disadvantages. In the folded hose, a substantial suction resistance is produced which reduces the suction capacity of the arrangement. Rubber and other sealing materials do not withstand high temperatures. Folded hoses and movable sealings get rapidly worn. Holes in hose folds and untight sealings give rise to leakage reducing the vacuum in the suction means. Folded hoses, besides, can be troublesome to handle.

The present invention solves the aforesaid problems in a simple and efficient manner by means of an arrangement, which is of simple design and cheap to manufacture. No sealings of rubber are required, and the only piece to be handled is a relatively short hose.

The present invention relates to an arrangement for supplying gaseous substances to and removing them from a movable object, and particularly for sucking waste gases from movable objects in a room, which arrangement is intended to be connected to a suction hose moved together with the object being the source of the waste gases.

The invention is characterized, in that the arrangement comprises a groove, which from above in its longitudinal direction is divided into two portions by means of a partition not extending all the way to the groove bottom, and which is filled with a liquid to such a level, that the partition partially is immersed in the liquid, one portion of said groove forming a closed cavity connected to a suction means, and the other groove portion being open above the liquid surface, and a pipe of V- or S-shape to be connected to said suction hose and movable in longitudinal direction in the groove, which pipe runs in said groove with one curved portion below the two liquid surfaces and the partition, and one mouth of the pipe is located above the liquid surface in the closed cavity, and the other pipe mouth connected to the suction hose is located above the liquid surface in the open portion of the groove.

An embodiment of the arrangement according to the invention is described in the following with reference to the accompanying drawing, in which FIG. 1 is a lateral view of an embodiment of the arrangement according to the invention, the groove being shown by way of a section.

Figure 2:
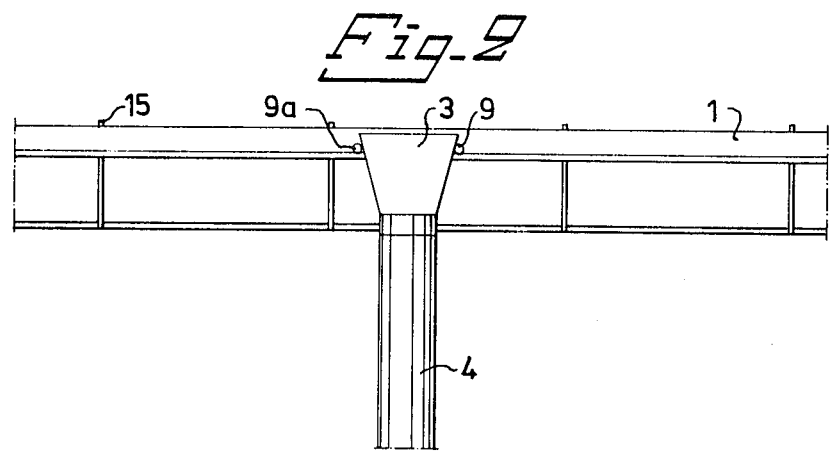

FIG. 2 shows a portion of the arrangement according to the invention, seen from one side of the groove.

FIG. 1 shows a cross-section of a groove 1, which is divided into two portions 5 and 6 means of a partition 7, which does not extend all the way to the groove bottom. The groove is stayed by consoles 15, which preferably consist of a plurality of strip iron pieces. The groove is filled with a liquid 2, for example water, to such a level that the partition 7 partially is immersed in the liquid. Hereby two liquid surfaces separated from each other are obtained. One groove portion 5 forms a closed cavity above the liquid surface, to which cavity, preferably at one end of the groove, a suction means 14 is connected. The other groove portion 6 is open above the liquid surface. On the outside of the wall of the portion 6 two longitudinal rails 8 and 10 are mounted. A carriage 13 is provided with two vertical rollers 9 and 9a running on the rail 8 and with two horizontal rollers 11, 12 running against each of the sides of the rail 10. The carriage 13 can thereby be moved along the groove 1 with horizontal guidance by the rail 10. Above the rollers 9 and 9a an S-shaped pipe 3 is rigidly attached with one curved portion to the carriage 13, in the manner shown in the figure. One mouth of the pipe is connected to a suction hose 4. The other curved portion of the pipe is immersed in the liquid and extends below the partition 7. The other mouth of the pipe is located in the closed cavity above the liquid surface.

FIG. 2 illustrates the arrangement mounted in a room and seen from the side on which the suction hose is connected. The free end of the suction hose 4 is connected to a waste gas source in the room. The waste gases are sucked up through the suction hose 4, the pipe 3 and into the closed cavity 5, from which they are sucked out through the suction means. Due to the vacuum, the liquid level in the closed cavity is somewhat higher than in the open portion 6. When the suction hose participates in the movement of the waste gas source in the room, the carriage 13 follows therewith along the groove 1. Owing to the liquid 2, the closed cavity is all the time completely sealed. The liquid level must all the time be so high that beneath the partition 7 no leakage caused by splashing liquid can occur. For this reason, preferably an automatic device is provided, by which the liquid level is sensed and upon demand liquid is filled up. Said device, for example, can be a float valve connected to a water conduit, or a fill-up means connected to a large reservoir of a kind similar to that used in systems for supplying cattle with water. A level control device, consisting e.g. of a water level tube, can also be provided for checking the operation of the filling up arrangement. In order to prevent evaporation of water in the groove, the water can also be covered with an oil layer. Preferably also an overflow means and a drain cock in the bottom of the groove for emptying the system are provided.

At certain applications, the pH value of the liquid can decrease by long-time contact with waste gases in the closed cavity. This decrease is not desirable because a pure liquid can involve the risk of corrosion in the pipe and groove material. This can, however, easily be prevented by a known pH value control device, which preferably is installed at the overflow means. When the suction means is not used, the suction hose can be lifted out of the way by some known lifting means. The invention is not restricted to the embodiment described above and shown in the drawing, but parts and details can be modified within the scope of the invention defined in the attached claims.

In large rooms, for example, it can be advantageous to install two adjacent grooves with one suction means common to both grooves. One groove can also be arranged as an endless lead and return loop so that one or more carriages can be moved forth and back. The invention is not restricted to the evacuation of gaseous substances, but can be applied also to injecting, for example, air into a room.

I claim:

1. An arrangement for supplying or removing gaseous substances to or from a movable object, particularly for evacuating waste gases from movable objects in a room, and intended to be connected to a suction hose moved with the object being the source of the waste gases, said arrangement comprising an elongate trough having a pair of side walls and a bottom wall, a partition disposed within said trough between said side walls and spaced therefrom and from said bottom wall and a connecting wall between said partition and a side wall of said trough, said partition dividing said trough longitudinally into first and second portions a sealing liquid within the trough, the partition partially being immersed in the sealing liquid, said first portion defining a closed cavity and suction means communicatively coupled thereto, said second portion being open above the surface of the sealing liquid, and a pipe having one end adapted to be coupled to the source via the suction hose and movable within said trough in the longitudinal direction along the length thereof said pipe having a bent end introducable into said trough passing through both first and second portions, disposed below the partition and opening to the interior of the closed cavity, said bent end including a curved portion disposable below the sealing liquid surfaces in said first and second portions, said curved portion passing through both first and second portions, below the partition and opening to the interior of the closed cavity, carriage means coupling said pipe to said trough and means for moving said carriage and pipe together along the length of said trough with the bent end of said pipe positioned within said trough 2. An arrangement according to claim 1 in which said bent end of said pipe is of V-shaped configuration.

3. An arrangement according to claim 1 in which said pipe is of S-shaped configuration.

4. An arrangement according to claim 1 and rail means attached to the trough and roller means associated with said carriage and engageable with said rail means to enable movement of said carriage along said trough, and guide means on said carriage and the exterior bottom wall of said trough for stabilizing the carriage during movement thereof along the length of said trough.

5. An arrangement according to claim 4 in which said bent end of said pipe is of V-shaped configuration.

6. An arrangement according to claim 4 in which said pipe is of S-shaped configuration.

* * * * *